(12) United States Patent
Kan (10) Patent No.: US 10,687,639 B2
(45) Date of Patent: Jun. 23, 2020

(54) WALL FASTENER

(71) Applicant: Makoto Kan, Tokyo (JP)

(72) Inventor: Makoto Kan, Tokyo (JP)

(*) Notice: Subject to any disclaimer, the term of this patent is extended or adjusted under 35 U.S.C. 154(b) by 0 days.

(21) Appl. No.: 16/022,280

(22) Filed: Jun. 28, 2018

(65) Prior Publication Data

US 2019/0038052 A1 Feb. 7, 2019

(30) Foreign Application Priority Data

Aug. 1, 2017 (JP) .............................. 2017-003545 U (51) Int. Cl.
*A47F 1/14* (2006.01)
*A47G 1/20* (2006.01)
*B43M 15/00* (2006.01)
*A47G 1/22* (2006.01)
*A61H 3/02* (2006.01)
*A47G 25/06* (2006.01)
*F16M 13/02* (2006.01)

(52) U.S. Cl.
CPC ................ *A47G 1/20* (2013.01); *A47G 1/22* (2013.01); *A47G 25/0614* (2013.01); *A61H 3/02* (2013.01); *B43M 15/00* (2013.01); *A61H 2003/0261* (2013.01); *F16M 13/02* (2013.01)

(58) Field of Classification Search
CPC .............. A47G 1/20; A47G 1/22; F16B 45/00
See application file for complete search history.

(56) References Cited

U.S. PATENT DOCUMENTS

| | | | | | |
|---|---|---|---|---|---|
| 1,616,957 | A | * | 2/1927 | Honigbaum | A47G 1/22 211/87.01 |
| 1,651,392 | A | * | 12/1927 | Honigbaum | A47G 1/22 248/217.3 |
| 3,298,651 | A | * | 1/1967 | La Passer | A47G 1/20 248/217.2 |
| 5,267,718 | A | * | 12/1993 | Sheehan | A47G 1/22 248/217.3 |
| 5,372,186 | A | * | 12/1994 | Taki | H01L 23/4006 165/80.3 |
| 2007/0194202 | A1 | * | 8/2007 | Lamotta | A47G 1/20 248/475.1 |

* cited by examiner

*Primary Examiner* — Amy J. Sterling
(74) *Attorney, Agent, or Firm* — Locke Lord LLP (57) ABSTRACT

A wall fastener for fastening an object to a wall includes a fastening body, a hanging member and an attaching pin. The fastening body has a utility surface and an attachment surface. The hanging member extends from the utility surface of the fastening body for allowing the object to be hung on the hanging member. The attaching pin extends from the attachment surface of the fastening body. The attaching pin is arranged to detachably penetrate into the wall for detachably attaching the object on the wall.

14 Claims, 9 Drawing Sheets

WALL FASTENER

BACKGROUND OF THE PRESENT INVENTION

Field of Invention

The present invention relates to a fastening device, and more particularly to a wall fastener which is capable of attaching an object on a wall but merely imparting minimum damage on a wall surface.

Description of Related Arts

Fastening devices have widely been used throughout the world for attaching an object on a wall or other panel-made structures. The simplest form of the fastening device simply comprises a screw member which may be screwed into a wall surface so that the external object may be hung on the screw member.

Very often, however, conventional fastening devices such as the one described above impart substantial damage to the wall surface. When the fastening device is detached from the wall, a visually significant hole or slot is formed on the wall. This is often undesirable because the hole or slot is usually aesthetically unappealing and requires filling. Another disadvantage of conventional fastening devices is that once they are mounted on the wall surface, it is very difficult for users to detach them from the wall.

As a result, there is a need to develop a wall fastener which is easy to attach to and detach from a wall, and which impart a minimum amount of damage to the corresponding wall surface.

SUMMARY OF THE PRESENT INVENTION

Certain variations of the present invention provide a wall fastener which is capable of attaching an object on a wall but merely imparting minimum damage on a wall surface.

In one aspect of the present invention, it provides a wall fastener for fastening an object to a wall, comprising:

a fastening body having a utility surface and an attachment surface, the utility surface and the attachment surface forming on two opposite sides of the fastening body respectively;

a hanging member extended from the utility surface of the fastening body for allowing the object to be hung on the hanging member; and an attaching pin extended from the attachment surface of the fastening body, the attaching pin being arranged to detachably penetrate into the wall for detachably attaching the object on the wall.

In another aspect of the present invention, it provides a wall fastening kit for fastening an object to a wall, comprising:

a wall fastener, which comprises:

a fastening body having a utility surface, an attachment surface and a detachment hole, the utility surface and the attachment surface forming on two opposite sides of the fastening body respectively;

a hanging member extended from the utility surface of the fastening body for allowing the object to be hung on the hanging member; and an attaching pin extended from the attachment surface of the fastening body, the attaching pin being arranged to detachably penetrate into the wall for detachably attaching the object on the wall; and a fastener remover, which comprises:

an elongated remover handle having an upper portion; and a lifting member provided on the upper portion of the elongated remover handle, the lifting member comprising a base and an insertion member extended from the base for inserting into the detachment hole of the fastening body for removing the wall fastener from the wall.

In another aspect of the present invention, it provides a wall fastener for fastening an object to a wall, comprising:

a fastening body having an attachment surface and a detachment hole for allowing a fastener remover to detach said wall fastener through said detachment hole; and a plurality of attaching pins extended from said attachment surface of said fastening body, said attaching pins being formed by folding pre-cut foldable pieces formed on said attachment surface towards said wall surface, and arranged to detachably penetrate into said wall for detachably attaching said object on said wall.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
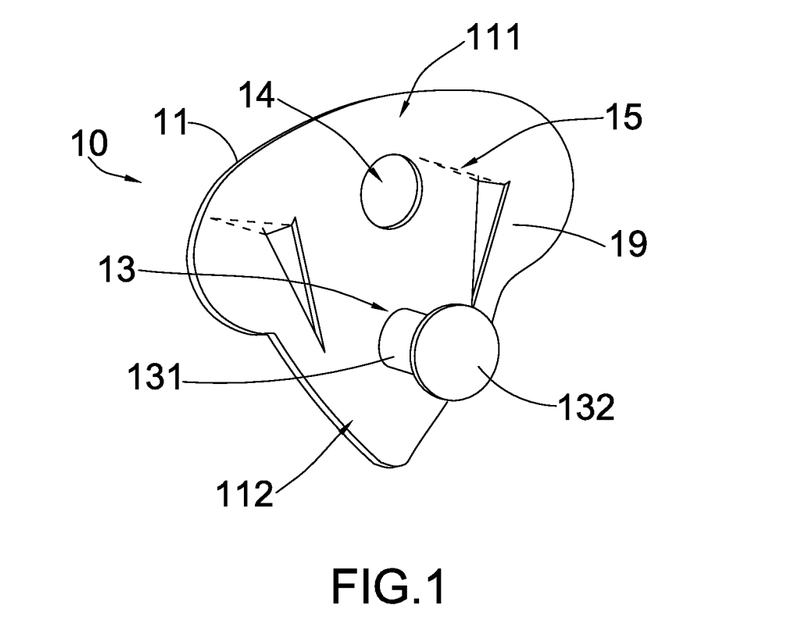
FIG. 1 is a schematic diagram of a wall fastener according to a first preferred embodiment of the present invention.
Figure 2:
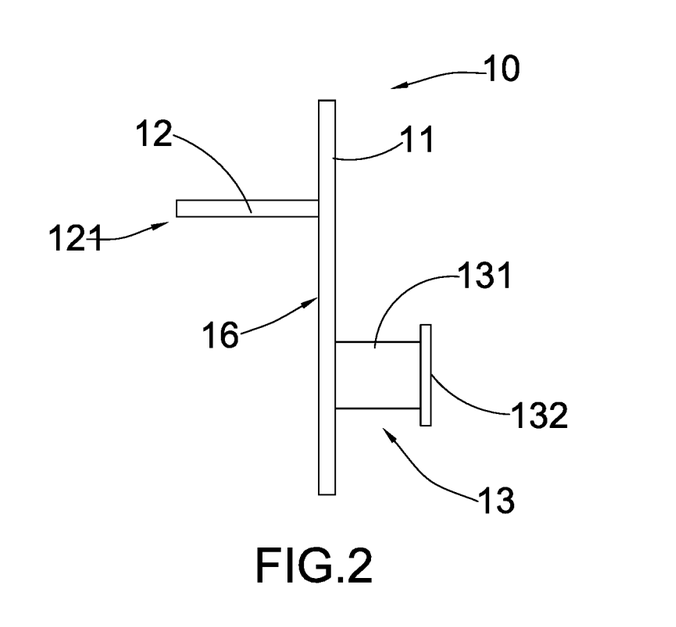
FIG. 2 is a side view of the wall fastener according to the first preferred embodiment of the present invention.
Figure 3:
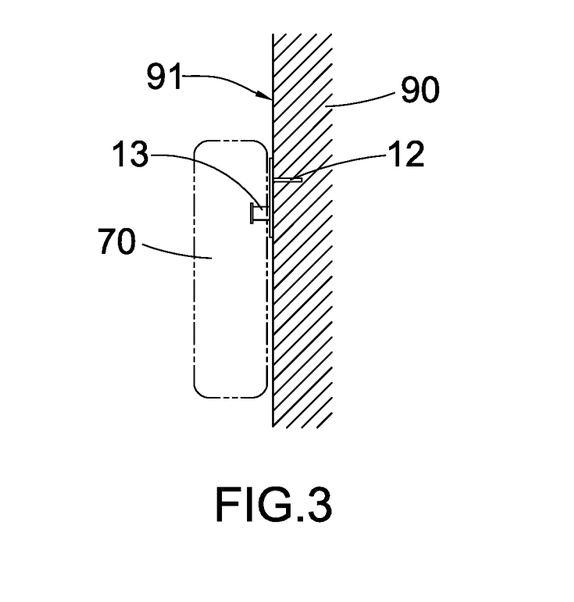
FIG. 3 is a schematic diagram of the wall fastener according to the first preferred embodiment of the present invention.

Referring to FIG. 1 to FIG. 3 of the drawings, a wall fastener 10 according to a first preferred embodiment of the present invention is illustrated. The wall fastener 10 is for fastening an object 70 to a wall 90 having a wall surface 91. Broadly, the wall fastener 10 may comprise a fastening body 11, a hanging member 13 and an attaching pin 12.

The fastening body 11 may have a utility surface 15 and an attachment surface 16. The utility surface 15 and the attachment surface 16 may be formed on two opposite sides of the fastening body 11 respectively.

The hanging member 13 may extend from the utility surface 15 of the fastening body 11 for allowing the object 70 to be hung on the hanging member 13.

The attaching pin 12 may extend from the attachment surface 16 of the fastening body 11. The attaching pin 12 may be arranged to detachably penetrate into the wall 90 for detachably attaching the object 70 on the wall 90.

According to the first preferred embodiment of the present invention, the fastening body 11 may be configured from metallic material for ensuring sufficient structural integrity and strength of the wall fastener 10. The fastening body 11 may be configured to have a wide variety of cross sectional shapes so as to satisfy different manufacturing and operational circumstances. As shown in FIG. 1 of the drawings the fastening body 11 may have an enlarged upper portion 111, and a contracted lower portion 112, wherein the attaching pin 12 may extend from the enlarged upper portion 111, while the hanging member 13 may extend from the contracted lower portion 112.

In this first preferred embodiment of the present invention, the wall fastener 10 may comprise a total of two attaching pins 12 extended from the enlarged upper portion 111 of the fastening body 11. The attaching pins 12 may extend from the fastening body 11 at positions at two sides of an imaginary center line of the fastening body 11. A width of the enlarged upper portion 111 may be longer than that of the contracted lower portion 112.

The fastening body 11 may further have a detachment hole 14 formed thereon for allowing a user to detach entire wall fastener 10 through the use of the detachment hole 14. The detachment hole 14 may be formed on the enlarged upper portion 111 of the fastening body 11 at a position between the two attaching pins 12.

As shown in FIG. 1 of the drawings, the enlarged upper portion 111 of the fastening body 11 may have a curved contour wherein the detachment hole 14 and the hanging member 13 may be aligned on the imaginary center line of the fastening body 11. Moreover, the two attaching pins 12 are positioned at two sides of the detachment hole 14 and above the hanging member 13.

Each of the attaching pins 12 has a sharp penetrating tip 121 for penetrating on the wall surface 91. Each of the attaching pins 12 has an angle of inclination of less than 30 degrees. On the other hand, the hanging member 13 may comprise a hanging pin 131 extended from the utility surface 15, and a stopper head 132 formed at a free end of the hanging pin 131. The stopper head 132 may have a diameter larger than that of the hanging pin 131 so as to provide a stopper for the hanging member 13.

It is worth mentioning that the attaching pins 12 may be formed by folding two pre-cut foldable pieces 19 formed on the attachment surfaces 16 respectively towards the wall surface 91. Each of the pre-cut foldable pieces 19 may be configured as having a triangular cross-sectional shape and may an angle of inclination of less than 30 degrees, which form the above-mentioned angle of inclination of the corresponding attaching pin 12.

Moreover, the wall fastener 10 of the present invention may be detachably inserted into a wall surface 91 of a wall 90. The wall 90 may be configured from a wide variety of materials. Examples of the wall 90 may include a drywall or a wooden wall. The wall 90 may also broadly refer to a panel-like structure which have relatively flat surface as the wall surface 91. For example, plastic board may also be included within the meaning of the wall 90 described above.

Since the attaching pins 12 may be formed by folding the pre-cut foldable pieces 19, a thickness of the attaching pins 12 may be identical to a thickness of the fastening body 11. Thus, each of the attaching pins 12 may have a panel-like and flat structure which, when penetrating into the wall surface 91, may cause only minimal damage to the wall surface 91. Thus, the present invention may minimize the damage to the wall surface 91 when being inserted thereto.

Figure 4:
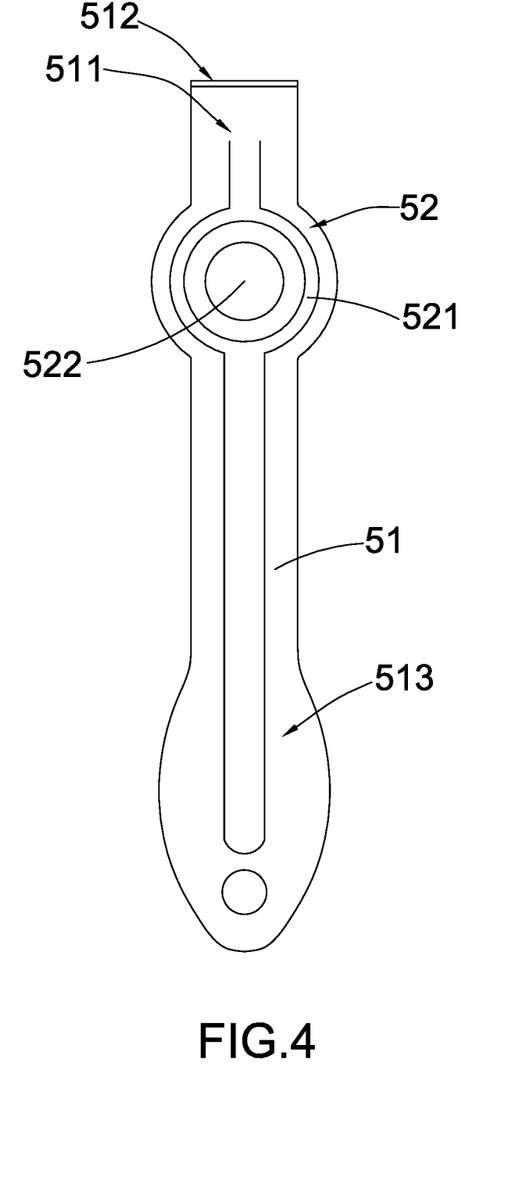
FIG. 4 is a front view of a wall fastener remover according to the first preferred embodiment of the present invention.
Figure 5:
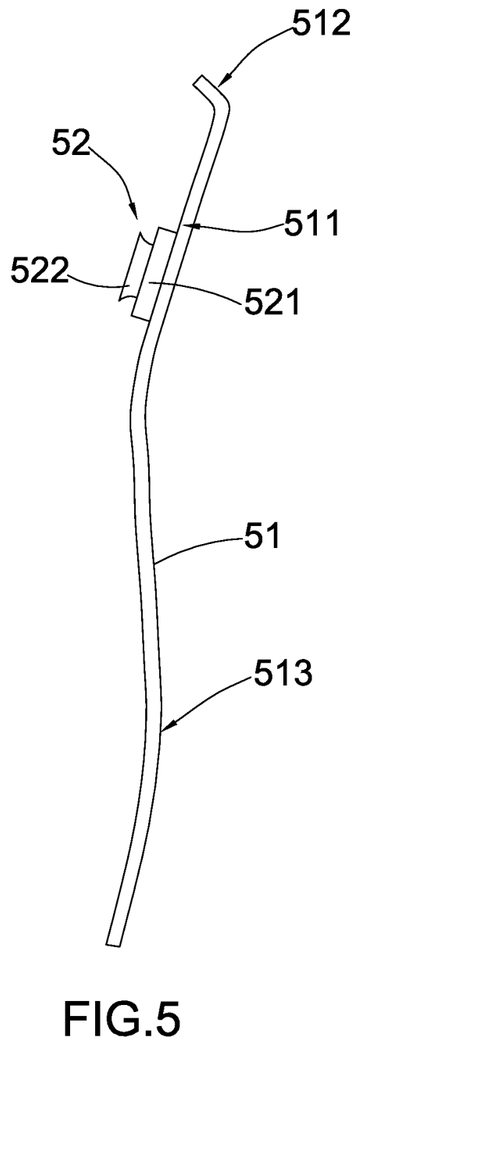
FIG. 5 is a side view of the wall fastener remover according to the first preferred embodiment of the present invention.

Referring to FIG. 4 to FIG. 5 of the drawings, in this first preferred embodiment, the wall fastener 10 may come with a fastener remover 50 so as to form a wall fastening kit. The wall fastening kit may this comprise the wall fastener 10 and the fastener remover 50. The fastener remover 50 may comprise an elongated remover handle 51, and a lifting member 52 provided on an upper portion 511 of the elongated remover handle 51. The lifting member 52 may comprise a base 521 and an insertion member 522 extended from the base 521 for inserting into the detachment hole 14 of the fastening body 11.

As shown in FIG. 5 of the drawings, each of the base 521 and the insertion member 522 may have a circular cross-sectional shape wherein a diameter of the insertion member 522 may be slightly less than that of the detachment hole 14 so that the insertion member 522 may penetrate therein. The base 521 may be arranged to bias against the utility surface 15 when the insertion member 522 is inserted into the detachment hole 14. This, the base 521 may have a diameter which is slightly larger than that of the detachment hole 14.

Moreover, the elongated remover handle 51 of the fastener remover 50 may further have an anchoring tip portion 512 extended from the upper portion 511 for biasing against the utility surface 15 when the insertion member 522 is inserted into the detachment hole 14. The anchoring tip portion 512 may be arranged to bias against the utility surface 15 when the insertion member 522 is inserted into the detachment hole 14 so as to act as an anchor point for allowing a user to conveniently and easily detach the wall fastener 10 from the wall surface 91. On the other hand, a lower portion 513 of the elongated remover handle 51 may provide a grabbing point for a user to hold the fastener remover 50. When the user wants to remove the wall fastener 10 from the wall surface 91, he may grab on the lower portion 513 of the elongated remover handle 51 and insert the insertion member 52 in the detachment hole 14. After that, he may exert a certain amount of force and use the anchoring tip portion 512 as an anchor point to pull out the wall fastener 10. Furthermore, the base 521 may also act as anchor and provide a supporting surface for allowing the user to conveniently and easily remove the wall fastener 10 from the wall 90.

Figure 6:
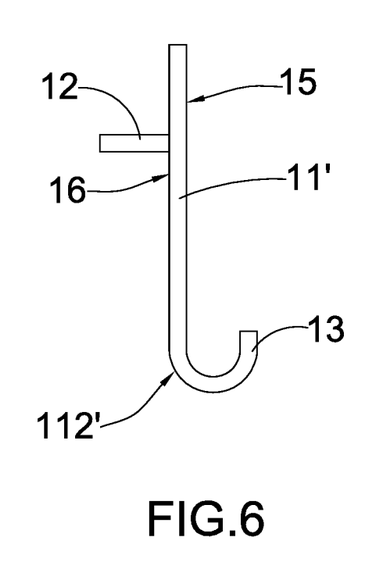
FIG. 6 is a front view of the wall fastener according to a first alternative mode of the first preferred embodiment of the present invention.
Figure 7:
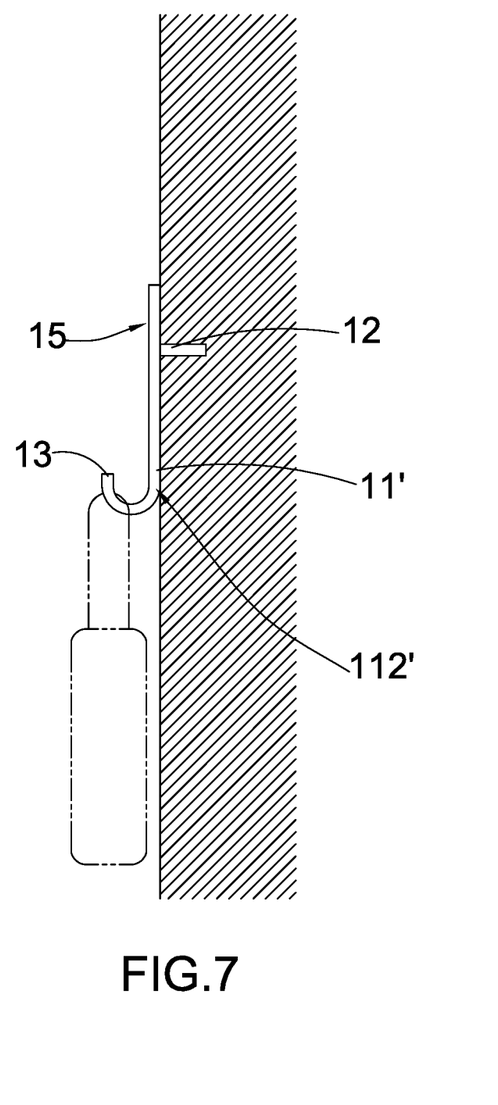
FIG. 7 is a side view of the wall fastener according to the first alternative mode of the first preferred embodiment of the present invention.

Referring to FIG. 6 to FIG. 7 of the drawings, a first alternative mode of the wall fastener according to the first preferred embodiment of the present invention is illustrated. The first alternative mode is identical to the first preferred embodiment described above, except the hanging member 13' and the shape of the fastening body 11'. In the first alternative mode, the fastening body 11' may have a uniform width and cross-sectional shape wherein the hanging member 13' may be configured to have a substantially U-shaped cross-sectional shape and may extend outwardly from a bottom edge 112' of the fastening body 11'. The hanging member 13' may extend outwardly in the direction away from the wall surface 91. A user may be able to suspendedly hang on an object 70 on the hanging member 13', as shown in FIG. 6 of the drawings.

In this first alternative mode, wall fastener may also comprise two attaching pins 12 which may be arranged to penetrate into the wall surface 91 of the wall. The attaching pins 12 are identical to that described in the first preferred embodiment above.

Again, the attaching pins 12 may be formed by folding two pre-cut foldable pieces 19 formed on the attachment surfaces 16 respectively towards the wall surface 91. Each of the pre-cut foldable pieces 19 may be configured as have a triangular cross-sectional shape and may an angle of inclination of less than 30 degrees.

Figure 8:
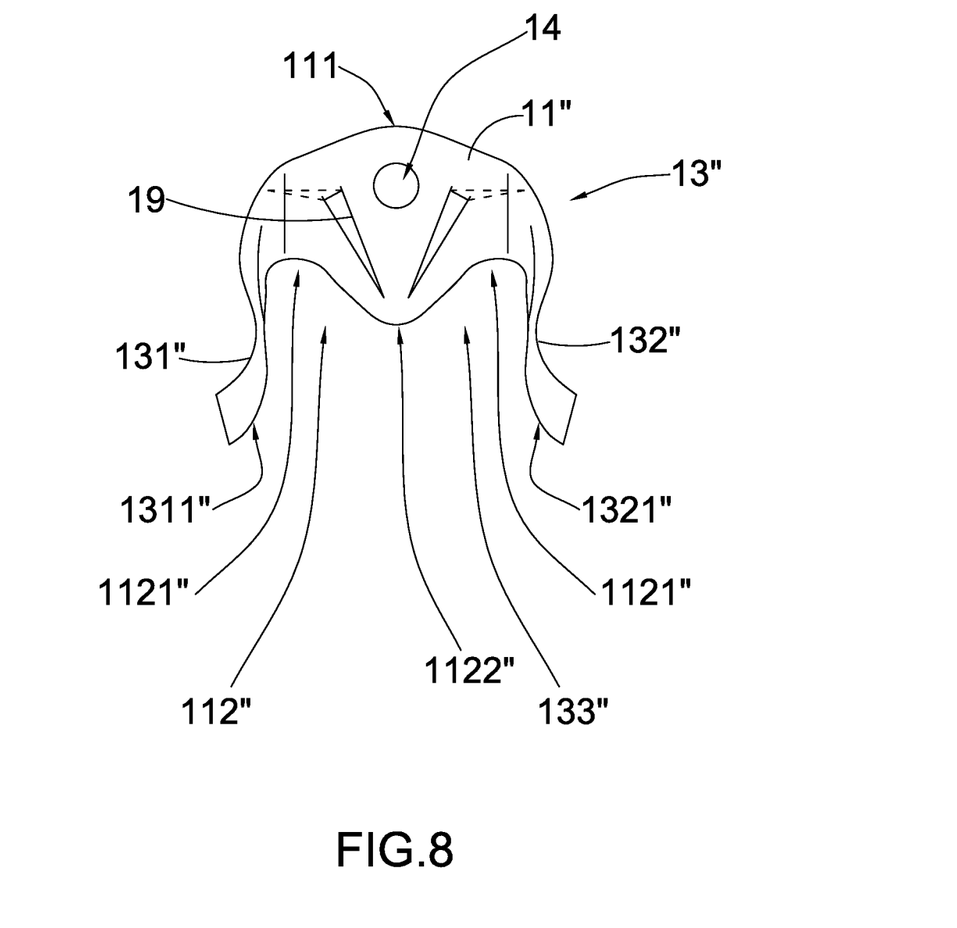
FIG. 8 is a schematic diagram of the wall fastener according to a second alternative mode of the first preferred embodiment of the present invention.
Figure 9:
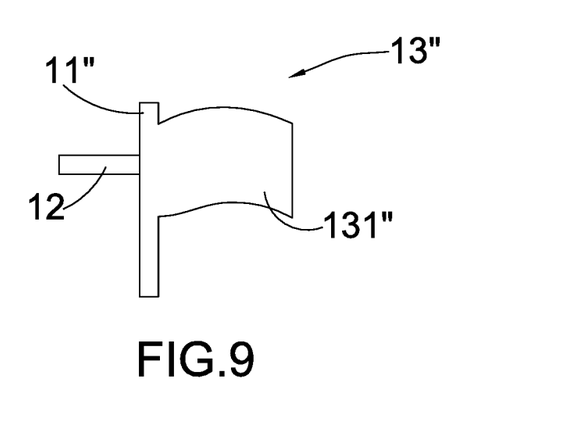
FIG. 9 is a front view of the wall fastener according to the second alternative mode of the first preferred embodiment of the present invention.
Figure 10:
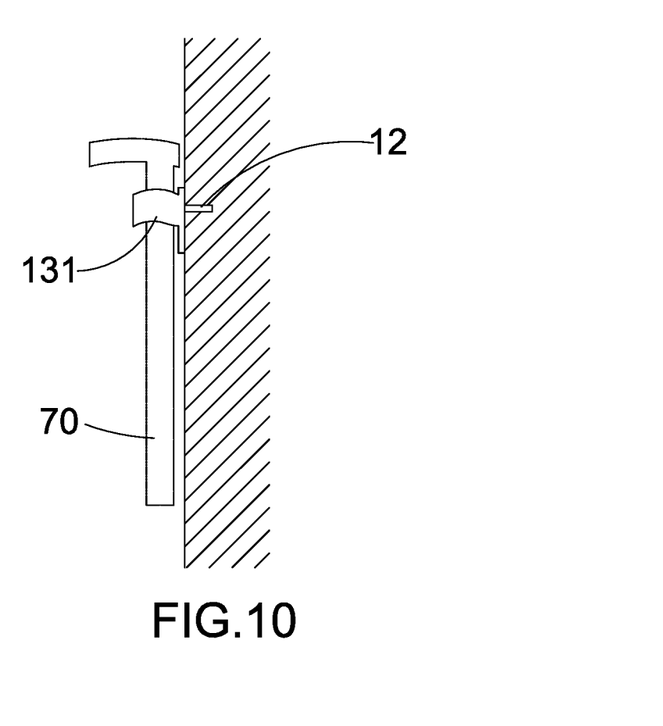
FIG. 10 is a side view of the wall fastener according to the second alternative mode of the first preferred embodiment of the present invention.

Referring to FIG. 8 to FIG. 10 of the drawings, a second alternative mode of the wall fastener according to the first preferred embodiment of the present invention is illustrated. The second alternative mode is identical to the first preferred embodiment described above, except the shape of the fastening body 11" and the hanging member 13".

According to the second alternative mode, the fastening body 11" does not have the enlarged upper portion 111 and the contracted lower portion 112. Rather, the fastening body 11" may be configured to have a curved contour in which an upper edge 111" thereof has a generally convex contour, while the bottom edge 112" may have a two side concave sections 1121" and a central convex section 1122" extended between the two side concave sections 1121".

On the other hand, the hanging member 13" may comprise a first hanging panel 131" and a second hanging panel 132" extended from two side edges of the contracted lower portion 112". The first hanging panel 131" and the second hanging panel 132" may extend from the fastening body 11" in the direction away from the wall surface 91. Each of the first hanging panel 131" and the second hanging panel 132" may have a predetermined curvature and elasticity to form a through holding cavity 133" in the space surrounded by an inner surface 1311" of the first hanging panel 131", an inner surface 1321" of the second hanging panel 132", and the utility surface 15.

As shown in FIG. 10 of the drawings, a user is able to penetrate the object 70 through the holding cavity 133" so that the inherent elasticity of the first hanging panel 131" and the second hanging panel 132" may exert holding force toward the object 70 so as to retain the object 70 by the hanging member 13".

In this second alternative mode, wall fastener may also comprise two attaching pins 12 which may be arranged to penetrate into the wall surface 91 of the wall 90. The attaching pins 12 are identical to that described in the first preferred embodiment above. Thus, the attaching pins 12 may be formed by folding two pre-cut foldable pieces 19 formed on the attachment surfaces 16 respectively towards the wall surface 91. Each of the pre-cut foldable pieces 19 may be configured as have a triangular cross-sectional shape and may an angle of inclination of less than 30 degrees, which form the angle of inclination of the corresponding attaching pin 12.

Figure 11:
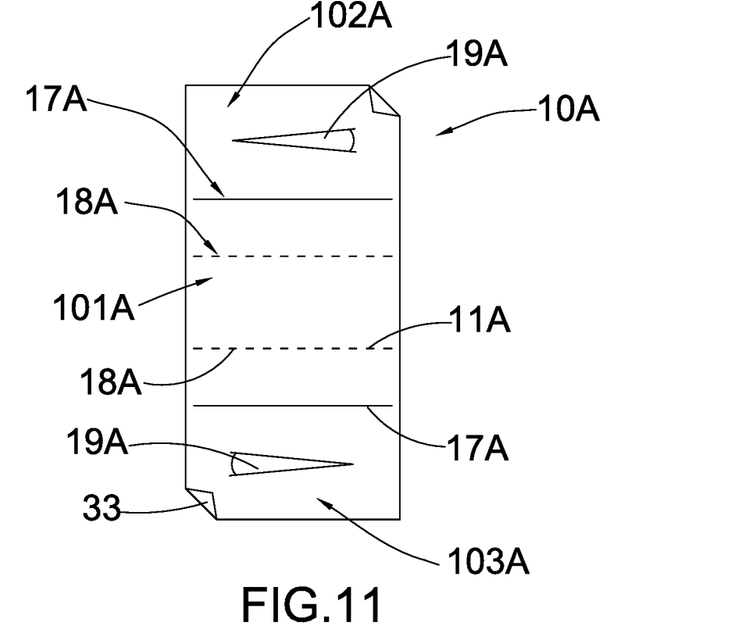
FIG. 11 is a front view of the wall fastener according to a third alternative mode of the first preferred embodiment of the present invention.
Figure 12:
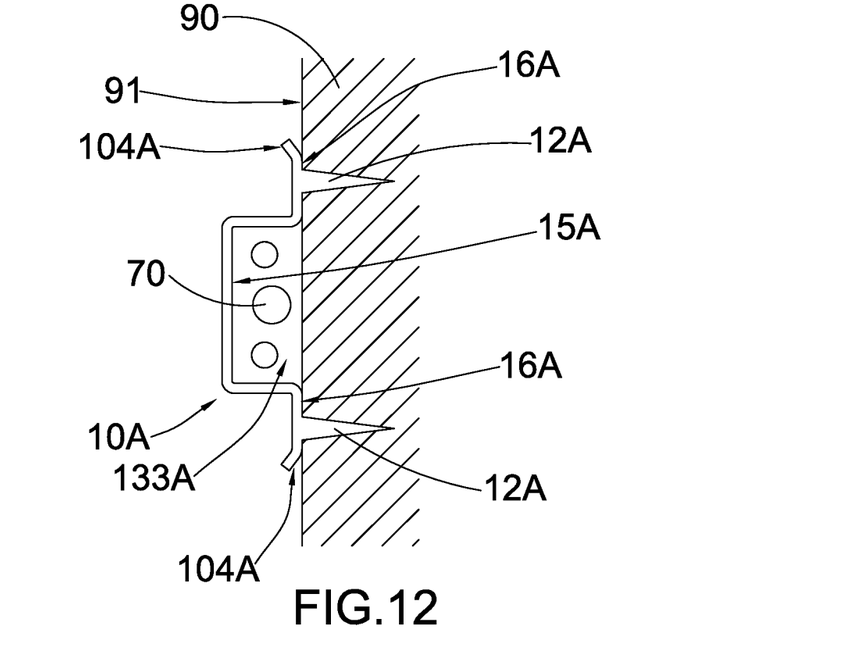
FIG. 12 is a schematic diagram of the wall fastener according to the third alternative mode of the first preferred embodiment of the present invention.

Referring to FIG. 11 to FIG. 12 of the drawings, a third alternative mode of the wall fastener 10A according to the first preferred embodiment of the present invention is illustrated. The third alternative mode is similar to the first preferred embodiment described above, except the shape of the fastening body 11A and the hanging member 13A.

According to the third alternative mode, the fastening body 11A may be configured to have a rectangular cross-sectional shape wherein the utility surface 15A and the attachment surface 16A may be formed on different portions of the fastening body 11A at the same side. As shown in FIG. 11 of the drawings, the fastening body 11A may have the utility surface 15A formed at a retention portion 101A thereof, while two attachment surfaces 16A may be formed on a top portion 102A and a bottom portion 103A of the fastening body 11A respectively, wherein the two attaching pins 12A may extend from the attachment surfaces 16A respectively.

The fastening body 11A may have two folding lines 17A formed thereon for dividing the utility surface 15A and the attachment surfaces 16A respectively. A user may be able to fold the fastening body 11A along the two folding lines 17A in such a manner that each of the utility surface 15A and the attachment surfaces 16A may face towards the wall surface 91. This configuration is shown in FIG. 12 of the drawings.

In this third alternative mode, the utility surface 15A and the wall surface 91 may form a holding cavity 133A for holding the object 70. The wall fastener in this alternative mode may be designed for primarily holding such object 70 as electric cables or the like. Thus, the object 70 may be retained in the holding cavity 133A surrounded by the utility surface 15A and wall surface 91. On the other hand, the attaching pins 12A may extend from the attachment surfaces 16A respectively for penetrating into the wall surface 91.

Note that a cross-sectional shape of the holding cavity 133A may be determined by the external contour of the utility surface 15A. For example, the utility surface 15A may have a curved cross-sectional shape when viewed from the side so that the utility surface may wrap around the object 70. On the other hand, the utility surface 15A may be configured to form a rectangular contour or cross-sectional shape when viewed from the side so that the object 70 may be received in a substantially rectangular-shaped holding cavity 133A. Accordingly, the fastening body 11A may further have two additional folding lines 18A extended along the utility surface 15A so that a user may be able to fold the utility surface 15A along the two additional folding lines 18A for folding the retention portion 101A of the fastening body 11A to have a rectangularly-shaped cross section. The present invention in this third alternative mode may be suited to hold objects 70 which are flexible and elongated, such as cables. The objects 70 may be held securely on the wall 90 through the wall fastener of the present invention.

It is also worth mentioning that the attaching pins 12 may be formed by folding two pre-cut foldable pieces 19A on the attachment surfaces 16A respectively towards the wall surface 91. Each of the pre-cut foldable pieces 19A may be configured as having a triangular cross-sectional shape and may an angle of inclination of less than 30 degrees.

In order to facilitate easy removal of the wall fastener 10A, the fastening body 11A may further have two extension members 104A extended from the top bottom 102A and the bottom portion 103A respectively, wherein the two extension members 104A may inclinedly extend away from the wall surface 91 for forming two small gaps 105A between the extension members 104A and the wall surface 91 respectively, wherein a user may detach the wall fastener 10A through inserting an appropriate tools in the small gap 105A. This configuration may be viewed from in FIG. 12 of the drawings, where the wall fastener is viewed from the top.

Figure 13:
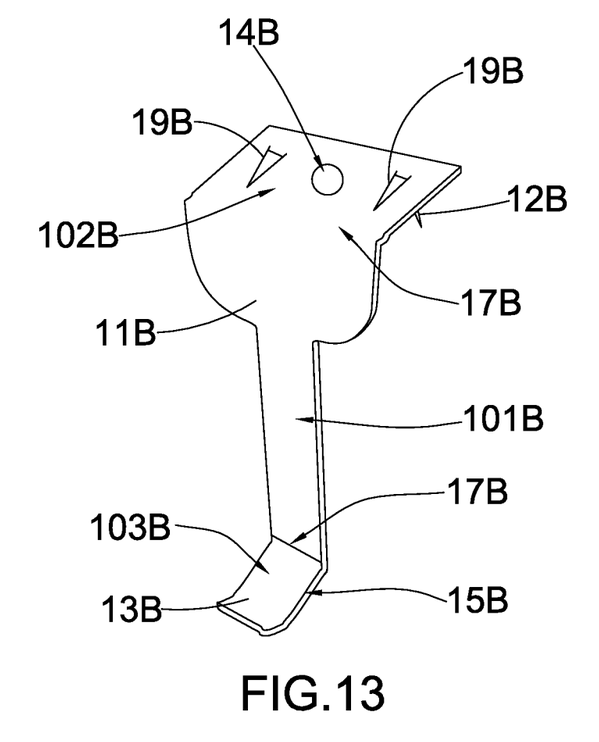
FIG. 13 is a perspective view of the wall fastener according to a fourth alternative mode of the first preferred embodiment of the present invention.
Figure 14:
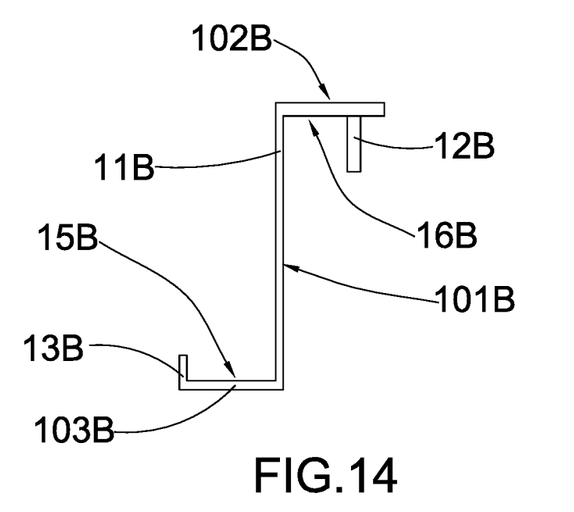
FIG. 14 is a side view of the wall fastener according to the fourth alternative mode of the first preferred embodiment of the present invention.

Referring to FIG. 13 to FIG. 14 of the drawings, a fourth alternative mode of the wall fastener according to the first preferred embodiment of the present invention is illustrated. The third alternative mode is similar to the first preferred embodiment described above, except the shape of the fastening body 11B and the hanging member 13B.

According to the fourth alternative mode, the fastening body 11B may be configured to have a rectangular cross-sectional shape wherein the utility surface 15B and the attachment surface 16B may be formed on different portions of the fastening body 11B on opposite sides. As shown in FIG. 13 of the drawings, the fastening body 11B may have a top portion 102B, a bottom portion 103B, and a retention portion 101B extending from the top portion 102B and the bottom portion 103B. The attachment surface 16B may be formed on the top portion 102B of the fastening body 11B, while the utility surface 15B may be formed on the bottom portion 103B of the fastening body 11B.

As shown in FIG. 12 to FIG. 13 of the drawings, the top portion 102B may be folded with respect to the retention portion 101B so that the attaching pins 12B may face downwardly in the direction of the bottom portion 103B. On the other hand, the bottom portion 103B may also be folded with respect to the retention portion 101B so that the utility surface 15B may face upwardly towards the attaching pins 12B.

The hanging member 13B may upwardly extend from the utility surface 15B on the bottom portion 103B of the fastening body 11B so as to allow the object 70 to be hung on the hanging member 13B.

The fastening body 11B may have two folding lines 17B formed thereon for dividing the top portion 102B, the retention portion 101B and the bottom portion 103B. A user may be able to fold the top portion 102B in a clockwise direction with respect to the retention portion 102B, while folding the bottom portion 103B in an anti-clockwise direction with respect to the retention portion 102B to form a reversed "Z" structure of the fastening body 11B. The detachment hole 14B may be formed on the top portion 102B of the fastening body 11B at a position between the two attaching pins 12B.

It is worth mentioning that the attaching pins 12B may be formed by folding two pre-cut foldable pieces 19B on the attachment surfaces 16B respectively towards the wall surface 91. Each of the pre-cut foldable pieces 19B may be configured as having a triangular cross-sectional shape and may an angle of inclination of less than 30 degrees.

The retention portion 101B may be designed to have a wide variety of cross sectional shape. It may have uniform width along a longitudinal axis thereof. On the other hand, the retention portion 101B may have differing widths along a longitudinal axis thereof, as shown in FIG. 13 of the drawings. The wall fastener in this fourth alternative mode may be used to hang the object 70 on a top edge of a door.

Figure 15:
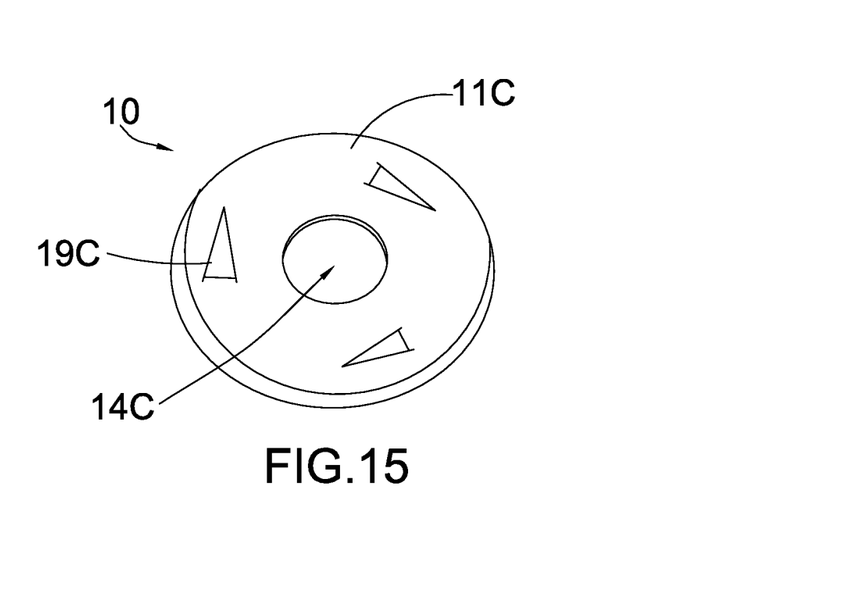
FIG. 15 is a front view of the wall fastener according to a second preferred embodiment of the present invention.
Figure 16:
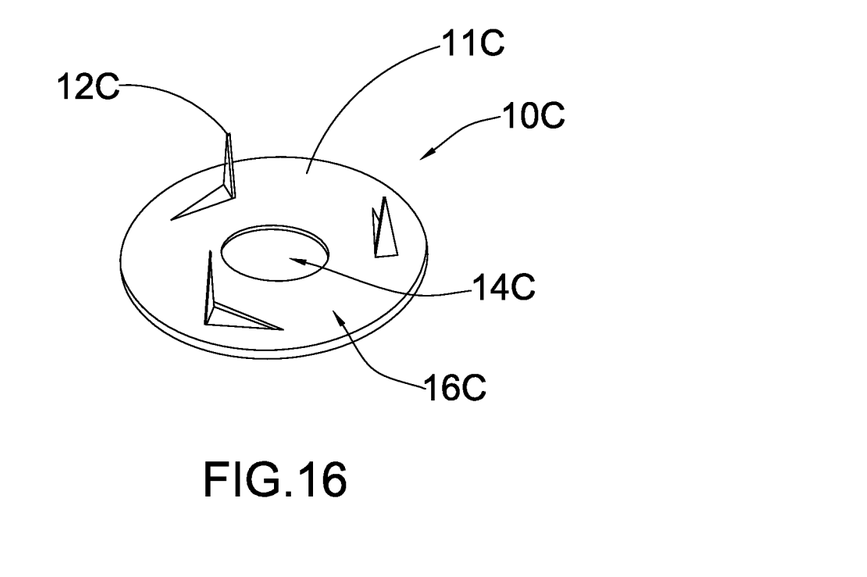
FIG. 16 is a rear view of the wall fastener according to the second preferred embodiment of the present invention.

Referring to FIG. 15 to FIG. 16 of the drawings, a wall fastener 10C according to a second preferred embodiment of the present invention is illustrated. The second preferred embodiment is similar to the first preferred embodiment described above, except the wall fastener 10C does not have the hanging member 13 and the utility surface 15C. Moreover, the fastening body 11C may have a substantially circular cross-sectional shape wherein the detachment hole 14C may be concentrically formed on a center portion of the fastening body 11C.

On the other hand, the wall fastener 10C may comprise three attaching pins 12C extended from the attachment surface 16C for penetrating into the wall surface 91 of the wall 90. Again, the attaching pins 12C may be formed by folding three pre-cut foldable pieces 19C on the attachment surfaces 16C respectively towards the wall surface 91. Each of the pre-cut foldable pieces 19C may be configured as having a triangular cross-sectional shape and may an angle of inclination of less than 30 degrees.

The attaching pins 12C may be distributed on the attachment surface 16C at positions between the circumferential edge of the fastening body 11C and the detachment hole 14C.

The wall fastener in this second preferred embodiment may be utilized for holding object 70 which is very thin and relatively light, such as business cards. The wall fastener 10C may penetrate the object 70 and attach on the wall surface 91. As such, the object 70 may be securely supported or sandwiched between the wall surface 91 and the attachment surface 16C while the attaching pins 12C may penetrate both the object 70 and the wall surface 91.

The present invention, while illustrated and described in terms of two preferred embodiments and several alternatives, is not limited to the particular description contained in this specification. Additional alternative or equivalent components could also be used to practice the present invention.

What is claimed is:

1. A wall fastener for fastening an object to a wall, comprising:
   a fastening body having a utility surface and an attachment surface, said utility surface and said attachment surface forming on two opposite sides of said fastening body respectively;
   a hanging member extended from said utility surface of said fastening body for allowing said object to be hung on said hanging member; and
   an attaching pin extended from said attachment surface of said fastening body, said attaching pin being arranged to detachably penetrate into a wall surface of the wall for detachably attaching said object on the wall and said attaching pin being distributed on the fastening body at a position between opposite outer edges of the fastening body such that the attachment surface exists continuously and unbroken between said attaching pin and the outer edges of the fastening body, which continuously surround the fastening body forming an unbroken line, and edges of said attaching pin are separate and mutually exclusive from the outer edges of the fastening body such that the edges of said attaching pin and the outer edges of the fastening body never intersect;
   wherein the fastening body has a shape selected from the group consisting of:
      an enlarged upper portion and a contracted lower portion shape, the attaching pin extending from the enlarged upper portion, while the hanging member extending from the contracted lower portion;
      a curved contour shape in which an upper edge thereof has a generally convex contour, while a bottom edge has two side concave sections and a central convex section extending between the two side concave sections;

a top portion, a bottom portion and a retention portion formed between the top portion and the bottom portion shape, wherein said utility surface is formed at the retention portion, the fastening body further having two attachment surfaces being formed on the top portion and the bottom portion of the fastening body respectively, the attaching pin extending from each of the attachment surfaces;

two folding lines formed on the fastening body shape for dividing said utility surface and said attachment surfaces respectively, whereby the fastening body is foldable along the two folding lines in such a manner that each of said utility surface and said attachment surfaces faces towards the wall surface;

a top portion, a bottom portion and a retention portion extending between the top portion and the bottom portion shape, said attachment surface being formed on the top portion, while said utility surface being formed on the bottom portion, the top portion being folded with respect to the retention portion so that the attaching pin faces downwardly in a direction of the bottom portion, while the bottom portion being folded with respect to the retention portion so that the utility surface faces upwardly towards the attaching pin; and a substantially circular cross-sectional shape.

2. The wall fastener, as recited in claim 1, wherein said attaching pin has a sharp penetrating tip for penetrating on said wall surface, said attaching pin has an angle of inclination of less than 30 degrees.

3. The wall fastener, as recited in claim 2, wherein said attaching pin is formed by folding a pre-cut foldable piece formed on said attachment surface towards said wall surface.

4. The wall fastener, as recited in claim 1, comprising two attaching pins, said attaching pins extending from said enlarged upper portion of said fastening body at two sides of an imaginary center line of said fastening body, said two attaching pins being formed by folding two pre-cut foldable pieces formed on said attachment surface towards said wall surface respectively.

5. The wall fastener, as recited in claim 1, wherein said fastening body has a uniform width and cross-sectional shape, said hanging member being configured to have a substantially U-shaped cross-sectional shape and extending outwardly from a bottom edge of said fastening body.

6. The wall fastener, as recited in claim 1, wherein said hanging member comprises a first hanging panel and a second hanging panel extended from two side edges of said contracted lower portion, said first hanging panel and said second hanging panel extending from said fastening body in a direction away from said wall surface, each of said first hanging panel and said second hanging panel having a predetermined curvature and elasticity to form a through holding cavity in a space surrounded by an inner surface of said first hanging panel, an inner surface of said second hanging panel, and said utility surface.

7. The wall fastener, as recited in claim 1, wherein said fastening body further has two extension members extended from said top portion and said bottom portion respectively, wherein said two extension members inclinedly extend away from said wall surface for forming two small gaps between said extension members and said wall surface respectively.

8. The wall fastener, as recited in claim 1, wherein said hanging member upwardly extends from said utility surface on said bottom portion of said fastening body.

9. A wall fastening kit for fastening an object to a wall, comprising:

a wall fastener, which comprises:

a fastening body having a utility surface, an attachment surface and a detachment hole, said utility surface and said attachment surface forming on two opposite sides of said fastening body respectively;

a hanging member extended from said utility surface of said fastening body for allowing said object to be hung on said hanging member; and an attaching pin extended from said attachment surface of said fastening body, said attaching pin being arranged to detachably penetrate into a wall surface of the wall for detachably attaching said object on the wall and said attaching pin being distributed on the fastening body at a position between opposite outer edges of the fastening body such that the attachment surface exists continuously and unbroken between said attaching pin and the outer edges of the fastening body, which continuously surround the fastening body forming an unbroken line, and edges of said attaching pin are separate and mutually exclusive from the outer edges of the fastening body such that the edges of said attaching pin and the outer edges of the fastening body never intersect;

wherein the fastening body has a shape selected from the group consisting of:

an enlarged upper portion and a contracted lower portion shape, the attaching pin extending from the enlarged upper portion, while the hanging member extending from the contracted lower portion;

a curved contour shape in which an upper edge thereof has a generally convex contour, while a bottom edge has two side concave sections and a central convex section extending between the two side concave sections;

a top portion, a bottom portion and a retention portion extending between the top portion and the bottom portion shape, said attachment surface being formed on the top portion, while said utility surface being formed on the bottom portion, the top portion being folded with respect to the retention portion so that the attaching pin faces downwardly in a direction of the bottom portion, while the bottom portion being folded with respect to the retention portion so that the utility surface faces upwardly towards the attaching pin; and a substantially circular cross-sectional shape; and a fastener remover, which comprises:

an elongated remover handle having an upper portion; and a lifting member provided on said upper portion of said elongated remover handle, said lifting member comprising a base and an insertion member extended from said base for inserting into said detachment hole of said fastening body for removing said wall fastener from said wall.

10. The wall fastening kit, as recited in claim 9, wherein said elongated remover handle of said fastener remover further has an anchoring tip portion extended from said upper portion for biasing against said utility surface when said insertion member is inserted into said detachment hole.

11. The wall fastening kit, as recited in claim 10, wherein said attaching pin is formed by folding a pre-cut foldable piece formed on said attachment surface towards said wall surface.

12. The wall fastening kit, as recited in claim 11, wherein said hanging member comprises a first hanging panel and a second hanging panel extended from two side edges of said contracted lower portion, said first hanging panel and said second hanging panel extending from said fastening body in a direction away from said wall surface, each of said first hanging panel and said second hanging panel having a predetermined curvature and elasticity to form a through holding cavity in said space surrounded by an inner surface of said first hanging panel, an inner surface of said second hanging panel, and said utility surface.

13. A wall fastener for fastening an object to a wall, comprising:
- a fastening body having an attachment surface and a detachment hole for allowing a fastener remover to detach said wall fastener through said detachment hole; and
- a plurality of attaching pins extended from said attachment surface of said fastening body, said attaching pins being formed by folding pre-cut foldable pieces formed on said attachment surface towards a wall surface of the wall, and arranged to detachably penetrate into said wall for detachably attaching said object on said wall;
- said attaching pins being distributed on the fastening body at a position between opposite outer edges of the fastening body such that the attachment surface exists continuously and unbroken between each of said attaching pins and the outer edges of the fastening body, which continuously surround the fastening body forming an unbroken line, and edges of each of said attaching pins are separate and mutually exclusive from the outer edges of the fastening body such that the edges of said attaching pin and the outer edges of the fastening body never intersect;
- wherein the fastening body has a shape selected from the group consisting of:
  - an enlarged upper portion and a contracted lower portion shape, the attaching pin extending from the enlarged upper portion, while the hanging member extending from the contracted lower portion;
  - a curved contour shape in which an upper edge thereof has a generally convex contour, while a bottom edge has two side concave sections and a central convex section extending between the two side concave sections;
  - a top portion, a bottom portion and a retention portion extending between the top portion and the bottom portion shape, said attachment surface being formed on the top portion, while said utility surface being formed on the bottom portion, the top portion being folded with respect to the retention portion so that the attaching pin faces downwardly in a direction of the bottom portion, while the bottom portion being folded with respect to the retention portion so that the utility surface faces upwardly towards the attaching pin; and
  - a substantially circular cross-sectional shape.

14. The wall fastener, as recited in claim 13, wherein each of said attaching pins has a sharp penetrating tip for penetrating on said wall surface, each of said attaching pins having an angle of inclination of less than 30 degrees.

* * * * *